(No Model.)
E. M. BENTLEY.
ELECTRIC RAILWAY CAR.
No. 454,020. Patented June 16, 1891.
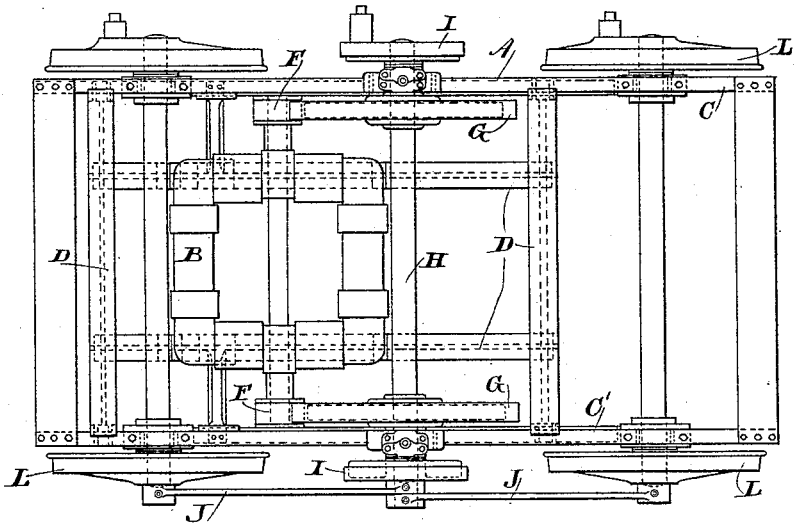
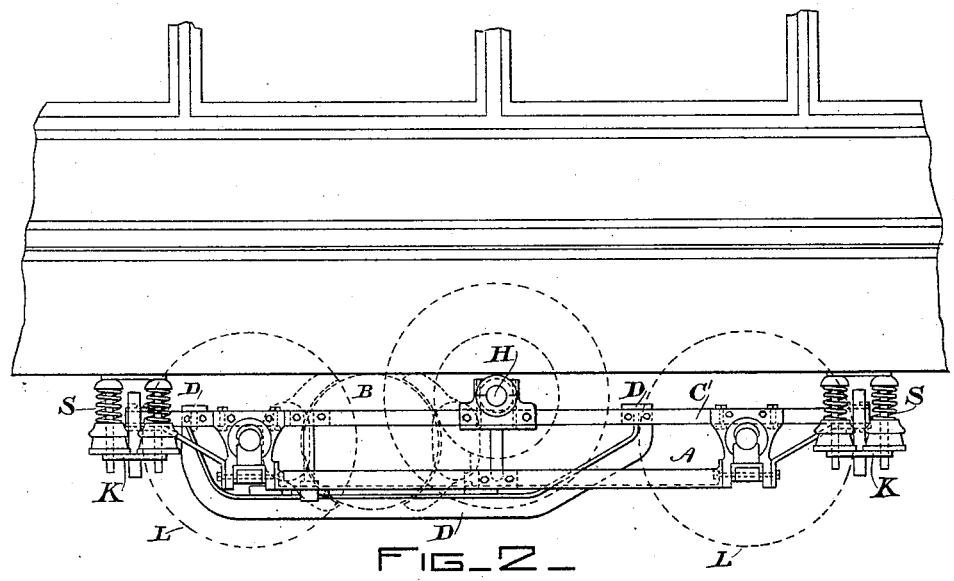
WITNESSES:
INVENTOR:
Edward M. Bentley
by Bentley Knight
ATTYS.

UNITED STATES PATENT OFFICE.

EDWARD M. BENTLEY, OF NEW YORK, N. Y.

ELECTRIC-RAILWAY CAR.

SPECIFICATION forming part of Letters Patent No. 454,020, dated June 16, 1891.

Application filed March 26, 1887. Serial No. 232,617. (No model.)

*To all whom it may concern:*

Be it known that I, EDWARD M. BENTLEY, a citizen of the United States, and a resident of New York city, New York, have invented certain new and useful Improvements in Electric Railways, of which the following is a specification.

My invention consists in a motor-truck adapted to be put under an ordinary street-car, the truck being provided with an electric motor, a counter-shaft extending transversely to the truck, having rigid bearings with the shaft of the motor and geared thereto, and connecting-rods extending from the crank-disks on the ends of the counter-shaft to the driving-wheels, there being substantially rigid bearings between the counter-shaft and the axles.

In the accompanying drawings, Figure 1 is a plan of my truck, and Fig. 2 is a side elevation showing parts of the car-body as well.

In Fig. 1, B is an electric motor with its field-magnet frame surrounding the armature and supported by hangers from a truck-frame A, the latter comprising side bars C C', having bearings on the axle inside the wheels, and motor-supporting bars D D, attached to the side bars and extending down below to within a short distance of the road-bed.

F F are pinions on the opposite ends of the motor-shaft, gearing into wheels G G on the counter-shaft H, mounted in bearings on the truck-frame.

On opposite ends of the shaft H are fixed crank-disks I I, from which connecting-rods J outside the wheels extend to the driving-wheels L.

K K, Fig. 2, are hangers supported by frame C and carrying springs S S, upon which the car-body rests. By this arrangement the motor and gearing are carried upon a truck-frame independently of and not subject to the vibrations of the car-body on its springs S S, thus providing a practicable way of constructing a connecting-rod truck.

The armature-shaft, counter-shaft, and axle all have bearings practically rigid with respect to one another.

Supporting the car-body upon the truck-frame dispenses with the necessity of a separate set of bearings upon the axles, and these springs, being placed some distance outside the axles, as shown in Fig. 2, furnish a longer spring-base and do away to a large extent with the vertical rocking of the car-body.

What I claim as new, and desire to secure by Letters Patent, is—

1. The combination of the truck-frame mounted upon the axles independently of the car-springs, the electric motor supported beneath the car-body on the frame, the counter-shaft having substantially rigid bearings on the frame with the motor and driven by the latter, and the car-axles having substantially rigid bearings with the counter-shaft and driven therefrom by means of connecting-rod J.

2. The combination of a truck-frame supported directly on the axles and supporting an electric motor and counter-shaft geared thereto with a connecting-rod between the counter-shaft and axle of the truck, and a car-body supported from the truck-frame by intermediate springs.

3. The combination of a truck-frame having a transverse counter-shaft located midway between the axles, an electric motor supported upon the frame and not subject to the vibrations of the car-body on its springs, connecting-rods extending from the counter-shaft to the respective axles, and the car-body spring supported from the truck-frame, as set forth.

4. The combination of an electric motor supported by a truck-frame not subject to the vibrations of the car-body on its springs and having its armature-shaft substantially in line horizontally with the axle with a counter-shaft on said frame, and thereby having substantially rigid bearings with the axle, a single set of reduction-gears between armature and counter-shaft, and a connecting-rod between the latter and driving-axle.

5. The combination of the wheels and axles of a truck driven by an electric motor with a truck-frame consisting of side bars in the general plane of the axles and a motor-supporting bar or bars attached thereto and extending down below the axles, as set forth, the motor being supported by said bar or bars and connected to the driven axle.

6. The combination of the truck-frame mounted on the axles independently of the car-springs by bearings inside the wheels and an electric motor supported thereby and geared to one or both the axles by a connecting-rod outside the wheels.

7. The combination of the truck-frame hung upon the axle and supporting an electric motor geared to the driven axle by a connecting-rod outside the wheels with the car-body supported on springs by the frame, as described.

8. The combination of the truck-frame hung upon the axle and supporting an electric motor geared thereto with the car-body supported from the frame by springs placed at points outside the axles, as described.

EDWARD M. BENTLEY.

Witnesses:
HARRY E. KNIGHT,
H. S. KNIGHT.